United States Patent
Ozaki et al.

(10) Patent No.: US 9,518,141 B2
(45) Date of Patent: Dec. 13, 2016

(54) RESOL-TYPE PARA-OCTYLPHENOL-FORMALDEHYDE CO-CONDENSATION RESIN AND METHOD FOR PRODUCING THE SAME

(71) Applicant: Taoka Chemical Co., Ltd., Osaka-shi, Osaka (JP)

(72) Inventors: Fumiya Ozaki, Osaka (JP); Hiroyuki Kashimoto, Sakai (JP); Nobuyuki Sato, Osakai (JP); Takafumi Yamamoto, Osakai (JP)

(73) Assignee: TAOKA CHEMICAL CO., LTD., Osaka (JP)

( * ) Notice: Subject to any disclaimer, the term of this patent is extended or adjusted under 35 U.S.C. 154(b) by 9 days.

(21) Appl. No.: 14/387,107

(22) PCT Filed: Feb. 28, 2013

(86) PCT No.: PCT/JP2013/055359
§ 371 (c)(1),
(2) Date: Sep. 22, 2014

(87) PCT Pub. No.: WO2013/146064
PCT Pub. Date: Oct. 3, 2013

(65) Prior Publication Data
US 2015/0051348 A1 Feb. 19, 2015

(30) Foreign Application Priority Data

Mar. 27, 2012 (JP) ................. 2012-072213

(51) Int. Cl.
| | |
|---|---|
| C08G 8/12 | (2006.01) |
| C08L 9/00 | (2006.01) |
| C08L 23/26 | (2006.01) |
| C08L 61/06 | (2006.01) |

(52) U.S. Cl.
CPC . *C08G 8/12* (2013.01); *C08L 9/00* (2013.01); *C08L 23/26* (2013.01); *C08L 61/06* (2013.01)

(58) Field of Classification Search
CPC ..................................... C08G 8/12; C08L 9/00
USPC ....................................................... 525/139
See application file for complete search history.

(56) References Cited

U.S. PATENT DOCUMENTS

| | | | | |
|---|---|---|---|---|
| 3,741,924 | A | * | 6/1973 | Okita et al. ............... C08G 8/30 524/271 |
| 5,252,405 | A | | 10/1993 | Kaido et al. |
| 5,717,053 | A | | 2/1998 | Inui et al. |
| 2009/0087787 | A1 | * | 4/2009 | Oya ..................... B41C 1/1016 430/286.1 |

FOREIGN PATENT DOCUMENTS

| | | | |
|---|---|---|---|
| CN | 1531559 | A | 9/2004 |
| EP | 0 602 861 | A2 | 6/1994 |
| JP | 60261706 | A * | 12/1985 |
| JP | H02-284910 | A | 11/1990 |
| JP | 4-175323 | | 6/1992 |
| JP | 4-293940 | | 10/1992 |
| JP | 6-234824 | | 8/1994 |
| JP | 2006-63320 | | 3/2006 |
| JP | 2006-89704 | | 4/2006 |
| JP | 2008-248040 | | 10/2008 |

OTHER PUBLICATIONS

International Search Report issued in related International Patent Application No. PCT/JP2013/055359, completed May 27, 2013.
Chinese Office Action dated Apr. 3, 2015 issued in Application No. 201380017138.6.

* cited by examiner

*Primary Examiner* — Mike M Dollinger
(74) *Attorney, Agent, or Firm* — Foley & Lardner LLP

(57) ABSTRACT

A resol-type para-octylphenol-formaldehyde co-condensation resin and a method for producing the same are provided, the resol-type para-octylphenol-formaldehyde co-condensation resin having a content of a para-octylphenol monomer of 1 wt. % or less, having a total content of an aliphatic hydrocarbon, a halogenated aliphatic hydrocarbon, an aromatic hydrocarbon, a halogenated aromatic hydrocarbon, and an alcohol having 1 to 8 carbon atoms of 1 wt. % or less, the aliphatic hydrocarbon, the halogenated aliphatic hydrocarbon, the aromatic hydrocarbon, the halogenated aromatic hydrocarbon, and the alcohol having a boiling point of 60° C. or more, having a softening point of 70 to 105° C., and having an acid value of 20 to 28 KOHmg/g. The resol-type para-octylphenol-formaldehyde co-condensation resin can be used as a resin cross-linking agent for a rubber.

3 Claims, No Drawings

RESOL-TYPE PARA-OCTYLPHENOL-FORMALDEHYDE CO-CONDENSATION RESIN AND METHOD FOR PRODUCING THE SAME

TECHNICAL FIELD

The present invention relates to phenol-formaldehyde co-condensation resins suitable as resin cross-linking agents for rubbers and methods for producing the same, and more particularly to a resol-type para-octylphenol-formaldehyde co-condensation resin and a method for producing the same.

BACKGROUND ART

Conventionally, resol-type alkylphenol-formaldehyde co-condensation resins in the form of flakes or particles have been used as resin cross-linking agents. A variety of resins have been produced as such resins, which differ in the number of carbon atoms of the alkylphenol used as a raw material. Among these, a resol-type para-octylphenol-formaldehyde co-condensation resin formed using p-octylphenol having 8 carbon atoms is suitably used as a resin cross-linking agent, because it has good compatibility with a rubber and can provide satisfactory rubber properties.

However, resol-type alkylphenol-formaldehyde co-condensation resins are generally known to have poor dispersibility in rubbers. In order to sufficiently disperse a resin cross-linking agent in a rubber, the rubber and the cross-linking agent are preferably kneaded at a temperature equal to or higher than the softening point of the resin cross-linking agent. However, if the kneading temperature becomes 120° C. or higher, the cross-linking reaction of the rubber will begin, and a uniform rubber composition cannot be obtained. As such, resin cross-linking agents having a softening point of 115° C. or lower are generally used.

Meanwhile, environmental pollution prevention has recently become a social issue, and it is necessary to reduce the amounts of impurities, residual raw materials, and residual solvents in products. Additionally, attention has also been focused on the issue of bad odors due to these residual matters, which has never been raised as a problem before. Similarly in the field of resin cross-linking agents, it is necessary to reduce the amounts of residual matters, and particularly, to reduce residual amounts of an alkylphenol used as a raw material and solvent(s) used in the production of a resin cross-linking agent. As an industrial method for reducing these residual amounts, the following method may be contemplated: a method in which the reaction time is lengthened to complete the condensation reaction of the alkylphenol and aldehyde used as raw materials as much as possible; or a method in which after the completion of the reaction, concentration is performed with heating to thereby remove the alkylphenol and the residual solvent content. With these methods, however, it is known that the softening point of the resin cross-linking agent rises, which leads to the problem of poor dispersibility in a rubber.

Japanese Patent Laying-Open No. 2006-089704 (patent document 1) and Japanese Patent Laying-Open No. 2006-063320 (patent document 2) propose adding a plasticizer or an oil to the resol-type alkylphenol-formaldehyde co-condensation resin, so as to lower the softening point of the resin cross-linking agent to improve the dispersibility in a rubber. With these methods, it is possible to eliminate the problem of poor dispersibility in a rubber caused by a rise in softening temperature, while reducing the amounts of an unreacted alkylphenol and remaining solvent(s). However, because a plasticizer or an oil is compounded with a resin, there is a concern for, for example, deterioration of the rubber properties due to bleeding of these components. The above-described methods have also had problems in that they cannot be used in the field of applications where the addition of these additives in itself is undesirable, and even in the field of applications where the addition of these additives is acceptable, if the application or customer demand varies, it is necessary to produce a resin cross-linking agent by selecting an appropriate plasticizer or oil in accordance with the demand, which makes the production operation very complicated.

Furthermore, in conventionally known resol-type alkylphenol-formaldehyde co-condensation resins, some cases have been observed where the cross-linking densities upon kneading and cross-linking with rubbers are still insufficient, and consequently, problems such as insufficient rubber properties, for example, heat aging resistance, strength, and the like, of the cross-linked rubbers, and swelling of the cross-linked rubbers have sometimes occurred.

CITATION LIST

Patent Document

PTD 1: Japanese Patent Laying-Open No. 2006-089704
PTD 2: Japanese Patent Laying-Open No. 2006-063320

SUMMARY OF INVENTION

Technical Problem

An object of the present invention is to provide a resol-type para-octylphenol-formaldehyde co-condensation resin and a method for producing the same, the resol-type para-octylphenol-formaldehyde co-condensation resin having reduced residual amounts of raw-material para-octylphenol and solvent(s) used, thereby not inviting environmental and bad odor issues, having excellent dispersibility when it is added to a rubber as a resin cross-linking agent, and being capable of providing improved cross-linking density and heat aging resistance of a cross-linked rubber, as compared to cases where conventionally known resin cross-linking agents are used.

Solution to Problem

The present inventors conducted extensive research to solve the aforementioned problem, and consequently found that environmental and bad odor issues can be eliminated by reducing the content of an unreacted para-octylphenol monomer to 1 wt. % or less, and reducing the content of remaining organic solvent(s) to 1 wt. % or less, and also found that dispersibility when it is added to a rubber can be improved by setting the softening point of the co-condensation resin to 70 to 105° C. The inventors also found that by setting the acid value to 20 to 28 KOHmg/g while meeting each of the above-described conditions, this co-condensation resin, when used as a resin cross-linking agent, provides improved cross-linking density and heat aging resistance of a cross-linked rubber, as compared to cases where conventionally known resin cross-linking agents are used, without impairing the fundamental performance as the cross-linking agent, such as easy moldability of a rubber.

The present invention also provides a method for producing a resol-type octylphenol-formaldehyde co-condensation resin that has been unable to produce with a conventionally known method, the resol-type octylphenol-formaldehyde co-condensation resin having a content of an unreacted para-octylphenol monomer of 1 wt. % or less, a content of remaining organic solvent(s) of 1 wt. % or less, a softening point of 70 to 105° C., and an acid value of 20 to 28 KOHmg/g. The method for producing the same according to the present invention includes the following three steps.

(1) Reacting para-octylphenol with formaldehyde at 40 to 100° C. using a hydroxide of an alkali metal as a catalyst in an amount of 0.15 to 0.24 equivalent per equivalent of the para-octylphenol, and in the presence of at least one of organic solvents selected from the group consisting of an aliphatic hydrocarbon, a halogenated aliphatic hydrocarbon, an aromatic hydrocarbon, a halogenated aromatic hydrocarbon, and an alcohol having 1 to 8 carbon atoms, the aliphatic hydrocarbon, the halogenated aliphatic hydrocarbon, the aromatic hydrocarbon, the halogenated aromatic hydrocarbon, and the alcohol having a boiling point of 60° C. or more, to obtain a resin liquid containing a resol-type para-octylphenol-formaldehyde co-condensation resin.

(2) Neutralizing the resin liquid with 0.3 to 2 equivalents of an acid component per equivalent of a base content of the hydroxide.

(3) Concentrating and thereafter heating at 100 to 140° C. the neutralized resin liquid to provide the resol-type para-octylphenol-formaldehyde co-condensation resin with a weight-average molecular weight of 1400 to 2600.

ADVANTAGEOUS EFFECTS OF INVENTION

The present invention can provide a resol-type para-octylphenol-formaldehyde co-condensation resin usable as a resin cross-linking agent for a rubber and a method for producing the same, the resol-type para-octylphenol-formaldehyde co-condensation resin being capable of eliminating environmental and bad odor issues, exhibiting dispersibility in a rubber equal to or higher than that of conventional products, and being capable of providing improved cross-linking density and heat aging resistance of a cross-linked rubber, as compared to cases where conventionally known resin cross-linking agents are used, without impairing the fundamental performance as the cross-linking agent, such as easy moldability of a rubber.

DESCRIPTION OF EMBODIMENTS

Hereinafter, the present invention will be described in detail. The resol-type para-octylphenol-formaldehyde co-condensation resin of the invention should have a content of an unreacted para-octylphenol monomer of 1 wt. % or less, and a content of remaining organic solvent(s) of 1 wt. % or less. Contents of more than 1 wt. % of these components are not preferable because they would cause an environmental issue or a bad odor. It is essential that the above contents be 1 wt. % or less, also in order to obtain the effect of the invention, that is, the cross-linking density and the heat aging resistance of a cross-linked rubber can be improved as compared to cases where conventionally known resin cross-linking agents are used.

Here, the "content of remaining organic solvent(s)" means a residual amount of organic solvent(s) used for a reaction, and specifically means a total content of an aliphatic hydrocarbon, a halogenated aliphatic hydrocarbon, an aromatic hydrocarbon, a halogenated aromatic hydrocarbon, and an alcohol having 1 to 8 carbon atoms, each having a boiling point of 60° C. or more.

The resol-type para-octylphenol-formaldehyde co-condensation resin of the invention should have a softening point of 70 to 105° C. If the softening point is lower than 70° C., the resin would cause blocking, which tends to make storage and handling of the resin difficult. If the softening point exceeds 105° C., when the resin is compounded into a rubber as a resin cross-linking agent, good dispersibility tends not to be obtained, which would cause a molding fault or deterioration of properties of a cross-linked rubber (such as deterioration of the elongation or strength of the rubber).

The resol-type para-octylphenol-formaldehyde co-condensation resin of the invention should have an acid value of 20 to 28 KOHmg/g. The acid value herein refers to a value measured according to JIS K-0070 titled "test methods for acid value, saponification value, ester value, iodine value, hydroxyl value and unsaponifiable matter of chemical products". If the acid value is lower than 20 KOHmg/g or higher than 28 KOHmg/g, the cross-linking density and the heat aging resistance of a cross-linked rubber tend not to be improved as compared to cases where conventionally known resin cross-linking agents are used, thereby not obtaining the effect of the invention.

When the resol-type para-octylphenol-formaldehyde co-condensation resin of the invention is used as a resin cross-linking agent for a rubber, the resin is used and contained in an amount of 1 to 20 parts by weight relative to 100 parts by weight of the rubber. If the content is lower than 1 part by weight, cross-linking will not proceed sufficiently and thus, a desired degree of improvement in the properties of a cross-linked rubber can not be observed. If the content is larger than 20 parts by weight, deterioration of a tensile property (in particular, deterioration of elongation at break Eb) or deterioration of compression set would be observed, which is not preferable.

Examples of the rubber that can be used with the resol-type para-octylphenol-formaldehyde co-condensation resin of the invention include, for example, a butyl rubber (IIR), a halogenated butyl rubber, an isobutylene-p-methylstyrene copolymer rubber, a natural rubber (NR), a styrene-butadiene copolymer rubber (SBR), a polybutadiene rubber (BR), a polyisoprene rubber (IR), and so on. The rubber components can be used either singly or as a mixture of two or more rubber components. Among the above rubber components, the butyl rubber and the halogenated butyl rubber are preferable as they have superior gas barrier property, oil resistance, and heat resistance, and when a rubber composition thereof is applied to packings or a bladder, the life can be greatly prolonged.

A cross-linking accelerator such as a chloroprene rubber (CR), stannous chloride, benzenesulfonic acid, calcium oxide, a molecular sieve or the like may be compounded into the rubber composition that contains the resol-type para-octylphenol-formaldehyde co-condensation resin of the invention, in order to promote the cross-linking reaction with the co-condensation resin. Apart from the cross-linking accelerator, other compounding agent(s) usually used in rubber industries, for example, a filler such as carbon black or the like, zinc oxide, stearic acid, oils, and so on can be selected as appropriate and compounded into the rubber composition as long as the object of the invention is not impaired. Commercial products can be suitably used as the compounding agents.

The rubber composition that contains the resol-type para-octylphenol-formaldehyde co-condensation resin of the invention may contain a cross-linked rubber in which the above-mentioned rubber has been cross-linked with the resol-type para-octylphenol-formaldehyde co-condensation resin. Such a rubber composition can be obtained by kneading an uncross-linked rubber with the resol-type para-octylphenol-formaldehyde co-condensation resin and an optionally added compounding agent, warming, extruding, and thereafter cross-linking them. The cross-linking temperature is, although not especially limited, preferably in a range of 120 to 230° C. The resultant cross-linked rubber can be used as various kinds of rubber products, and especially, can be suitably used as packings or a bladder.

Hereinafter, a method for producing the resol-type para-octylphenol-formaldehyde co-condensation resin of the invention will be described. First, the step [step (1)] of obtaining a resin liquid containing a resol-type para-octylphenol-formaldehyde co-condensation resin will be described in detail.

Any type of products can be used as para-octylphenol used in step (1) as long as it is industrially readily available.

Although formaldehyde used in step (1) can be in any form such as paraformaldehyde, formalin that is an aqueous solution of formaldehyde, or the like, formalin is preferably used in view of its easy handling. In addition, formaldehyde is used in an amount of normally 1 to 4 equivalents (moles), and preferably 1.5 to 3 equivalents (moles), per equivalent (mole) of para-octylphenol, in terms of an effective formaldehyde content. If the amount used is less than 1 equivalent, consumption of para-octylphenol will be insufficient, which tends to result in a residual amount of the para-octylphenol monomer in the co-condensation resin of more than 1 wt. %. If the amount of formaldehyde used is larger than 4 equivalents, a large amount of residual formaldehyde will arise, and it is thus likely that wastewater with high environmental load will be generated during the production, or that desired rubber properties cannot be obtained due to a molding fault such as foaming or the like when the resultant co-condensation resin is used as a cross-linking agent for a rubber.

Specific examples of the hydroxide of the alkali metal as the catalyst used in step (1) include potassium hydroxide, sodium hydroxide, lithium hydroxide, and the like. Among these, potassium hydroxide and sodium hydroxide are preferable. Although a hydroxide of an alkali metal in solid or liquid form can be used as the hydroxide of the alkali metal, an aqueous solution thereof is preferably used in view of its reactivity and easy handling. When the aqueous solution of the hydroxide of the alkali metal is used, the concentration thereof is generally 20 to 50 wt. %. The hydroxide of the alkali metal is used in an amount of 0.15 to 0.24 equivalent (mole) per equivalent of the para-octylphenol. If the amount used is less than 0.15 equivalent, consumption of para-octylphenol will be insufficient, which tends to result in a residual amount of the para-octylphenol monomer in the co-condensation resin of more than 1 wt. %. If the amount of the hydroxide of the alkali metal used is more than 0.24 equivalent, the acid value of the resultant co-condensation resin will be less than 20 KOHmg/g, which tends to cause the cross-linking performance to deteriorate when it is used as a cross-linking agent for a rubber.

The condensation reaction in step (1) is performed in the presence of organic solvent(s). As the organic solvent(s), one or a mixture of two or more of organic solvents is used selected from the group consisting of an aliphatic hydrocarbon, a halogenated aliphatic hydrocarbon, an aromatic hydrocarbon, a halogenated aromatic hydrocarbon, and an alcohol having 1 to 8 carbon atoms, each having a boiling point of 60° C. or more. Specifically, examples of the aliphatic hydrocarbon include heptane, octane, and the like, examples of the aromatic hydrocarbon include toluene, xylene, mesitylene, and the like, and examples of the alcohol include methanol, ethanol, propanol, butanol, amyl alcohol, hexanol, heptanol, octanol, and the like. Among these, the aromatic hydrocarbon is preferable, and toluene and xylene are more preferable. The amount of the organic solvent(s) used is generally 0.15 to 2 times by weight, and preferably 0.3 to 1.5 times by weight the amount of para-octylphenol. If the amount is less than 0.15 times by weight, the residual amount of the para-octylphenol monomer in the co-condensation resin tends to be small, whereas the softening point of the resultant co-condensation resin tends to be more than 105° C. If the amount of the organic solvent(s) used is more than 2 times by weight, the amount of residual para-octylphenol in the co-condensation resin will be large, or the concentration will require a long time, which causes polymerization of the co-condensation resin to proceed, and consequently, the softening point tends to be more than 105° C.

The condensation reaction in step (1) is carried out, after mixing each of the essential components described above, at a temperature of 40 to 100° C., and preferably 60 to 90° C. If the reaction temperature is lower than 40° C., the condensation reaction will be slow, which is industrially disadvantageous, and if the reaction temperature is higher than 100° C., gelation will proceed, which tends to be unable to obtain a resin liquid. The time required for this condensation reaction is generally 2 to 20 hours, although it depends on the reaction scale and the like.

Next, the step [step (2)] of neutralizing the resin liquid with 0.3 to 2 equivalents of an acid component per equivalent of a base content of the hydroxide of the alkali metal will be described in detail.

Prior to step (2), the resin liquid can also be diluted with an organic solvent to facilitate neutralization. The organic solvent for dilution may be the same as or different from the solvent(s) used in the reaction step. Although the organic solvent for dilution is not especially limited, for example, one or a mixture of two or more of organic solvents selected from the group consisting of an aliphatic hydrocarbon, a halogenated aliphatic hydrocarbon, an aromatic hydrocarbon, a halogenated aromatic hydrocarbon, and an alcohol having 1 to 8 carbon atoms can be used. The organic solvent for dilution is preferably an organic solvent having a boiling point of 60° C. or more. Specifically, examples of the aliphatic hydrocarbon include heptane, octane, and the like, examples of the aromatic hydrocarbon include toluene, xylene, mesitylene, and the like, and examples of the alcohol include methanol, ethanol, propanol, butanol, amyl alcohol, hexanol, heptanol, octanol, and the like.

The neutralization in step (2) is performed for the purpose of inactivating the hydroxide of the alkali metal used in the condensation reaction. Although the acid used in the neutralization is not especially limited, examples thereof include sulfuric acid, hydrochloric acid, acetic acid, oxalic acid, formic acid, phosphoric acid, and the like, which can be used singly or as a combination of two or more. The acid may also be in the form of an aqueous solution. When the aqueous solution of the acid is used, the concentration thereof is generally 5 to 50 wt. %. The amount of the acid used, in terms of an acid component, is generally 0.3 to 2 equivalents (mole), and preferably 0.5 to 1.5 equivalents (mole), per equivalent (mole) of a base content of the hydroxide of the alkali metal used in the condensation reaction. If the amount is less than 0.3 equivalent, the inactivation of the hydroxide of the alkali metal tends to be insufficient, and if the amount is more than 2 equivalents, the acid value of the resultant co-condensation resin will be less than 20 KOHmg/g, which may cause the properties of the cross-linked rubber to deteriorate when the resultant co-condensation resin is used as a cross-linking agent for a rubber.

The neutralized resin liquid thus obtained is further submitted to the step of concentrating and heating to provide the resin with a weight-average molecular weight of 1400 to 2600; however, prior to this step, the neutralized resin liquid can also be, for example, washed with water as required to improve the quality of the product.

Next, the step [step (3)] of concentrating and thereafter heating at 100 to 140° C. the neutralized resin liquid to provide the resol-type para-octylphenol-formaldehyde co-condensation resin with a weight-average molecular weight of 1400 to 2600 will be described in detail.

The weight average molecular weight herein represents a weight average molecular weight in terms of polystyrene, which is measured by gel permeation chromatography (GPC method) for the resin liquid or the co-condensation resin dissolved in a solvent (tetrahydrofuran). The measurement is conducted under the conditions described below in EXAMPLES.

The step of concentrating the resin liquid is generally performed at 120° C. or less. If the temperature is higher than 120° C., the weight average molecular weight of the resultant co-condensation resin will increase as the concentration time passes, which may cause the weight average molecular weight to be higher than desired. During the concentration, in order to maintain the temperature at 120° C. or lower, a method in which the reaction system is placed under a reduced pressure, and the concentration temperature is lowered, as required, can be adopted. The concentration is continued until the content of the unreacted para-octylphenol monomer and the content of the above-described organic solvent(s) in the co-condensation resin become 1 wt. % or less.

After the completion of the concentration step, the co-condensation resin is maintained at a temperature of 100 to 140° C., and preferably 110 to 130° C., to thereby provide the co-condensation resin with a weight average molecular weight of 1400 to 2600, and preferably 2000 to 2400. If the temperature is lower than 100° C., the condensation reaction of the resin will be slow, which tends to require a long time for the polymerization to a predetermined molecular weight, and if the temperature is higher than 140° C., the polymerization of the resin will be fast, which tends to make it difficult to control to a predetermined molecular weight, or cause the rubber cross-linking performance of the resultant co-condensation resin to deteriorate. If the weight average molecular weight is lower than 1400, the softening point of the resultant co-condensation resin may become less than 70° C., and consequently, the co-condensation resin may cause blocking, which tends to make storage and handling difficult. If the weight average molecular weight of the co-condensation resin is higher than 2600, the softening point of the resultant co-condensation resin may become higher than 105° C., and consequently, the dispersibility when used as a cross-linking agent for a rubber tends to be poor, and properties of the cross-linked rubber such as the elongation and strength of the rubber tend to deteriorate.

The co-condensation resin having a weight average molecular weight of 1400 to 2600 thus obtained is removed from the reaction vessel, and then made into a product using a conventional method such as grinding, granulation, or the like, so as to be provided as the resol-type para-octylphenol-formaldehyde co-condensation resin characterized by having a content of an unreacted para-octylphenol monomer of 1 wt. % or less, a content of remaining organic solvent(s) of 1 wt. % or less, a softening point of 70 to 105° C., and an acid value of 20 to 28 KOHmg/g.

EXAMPLES

The present invention will be further described in detail below with reference to Examples, which are in no way intended to limit the present invention.

(1) Production of Resol-Type Para-Octylphenol-Formaldehyde Co-Condensation Resins In the production of each resin, analysis was conducted based on the following analytical conditions.

<Weight Average Molecular Weight>

The method for measuring the weight average molecular weight (Mw) of a resin liquid or a co-condensation resin by gel permeation chromatography (GPC) was as follows. Thirty milligrams of the resin liquid or co-condensation resin was dissolved in 10 ml of tetrahydrofuran, and subjected to gel permeation chromatography (GPC) measurement under the following conditions to calculate Mw based on a calibration curve using polystyrene standards.

Apparatus: HLC-8220GPC (manufactured by TOSOH)

Column: TSK guard column SUPER HZ-L (manufactured by TOSOH);

TSK-GEL SUPER HZ1000 (4.6 mm Ø×150 mm);

TSK-GEL SUPER HZ2500 (4.6 mm Ø×150 mm); and

TSK-GEL SUPER HZ4000 (4.6 mm Ø×150 mm)

Detector: RI

Carrier and flow rate: tetrahydrofuran and 0.35 ml/min

Column temperature: 40° C.

<Acid Value of Co-Condensation Resin>

Acid value was measured by the method in accordance with JIS K-0070 titled "test methods for acid value, saponification value, ester value, iodine value, hydroxyl value and unsaponifiable matter of chemical products". A sample was dissolved in an n-hexane/ethanol (1:1) mixture solvent, a saturated aqueous solution of sodium chloride and sodium chloride were added thereto and mixed by stirring, and the resultant mixture was titrated with a phenolphthalein/ethanol solution.

<Contents of Unreacted Para-Octylphenol Monomer and Residual Organic Solvent(s)>

Contents of an unreacted para-octylphenol monomer and residual organic solvent(s) were quantified by gas chromatography (GC) under the following conditions.

Apparatus: gas chromatograph GC-14B, manufactured by SHIMADZU

Column: gas column, outside diameter 5 mm×inside diameter 3.2 mm×length 3.1 m filler: filler Silicone OV-17 10% Chromosorb WHP 80/100 mesh x, max. temp. 340° C.

Column temperature: 80° C.→280° C.

Vaporizing chamber temperature: 280° C.

Detector temperature: 280° C.

Detector: FID

Carrier: $N_2$ (40 ml/min)

Combustion gas: hydrogen (60 kPa) and air (60 kPa)

Injection volume: 2 µL.

Two grams of the co-condensation resin and 0.1 g of anisole as a reference standard were dissolved in 20 ml of acetone, and subjected to GC analysis under the following conditions to measure contents (wt. %) of the para-octylphenol monomer and the residual organic solvent(s) in the co-condensation resin, using the internal standard method (GC-IS method).

<Softening Point of Co-condensation Resin>
Softening point was measured by the method in accordance with JIS K2207.

Example 1

Synthesis of Resin E-1

A four-necked flask equipped with a reflux condenser and a thermometer was charged with 420 g (2.04 mol) of p-t-octylphenol (POP), 330 g (4.08 mol) of a 37 wt. % formaldehyde aqueous solution, 33.8 g (0.40 mol) of a 48% sodium hydroxide aqueous solution, and 267 g of toluene. The internal temperature was increased to 85° C., and then the reaction was carried out for 3 hours at the same temperature to obtain a resin liquid. After cooling this resin liquid, water and 100.5 g of 30 wt. % sulfuric acid were added thereto for neutralization, the mixture was stirred and allowed to stand, and the aqueous layer was subsequently separated. The toluene layer was then repeatedly washed with water twice to obtain the neutralized resin liquid. The toluene layer containing the neutralized resin liquid was subsequently vacuum concentrated for 6 hours at a reduced pressure of 200 to 30 torr and an internal temperature of 55 to 80° C., and was confirmed to contain 0.69 wt. % of unreacted POP and 0.67 wt. % of toluene. Then, the bath temperature was increased to 120° C., and then the concentrate was stirred for 1.5 hours while maintaining the temperature, thereby obtaining 520 g of resin E-1 having a weight average molecular weight of 2100. The amount of unreacted POP, the residual amount of the solvent, the softening point, and the acid value of the resultant resin E-1 are shown in Table 1.

Example 2

Synthesis of Resin E-2

A four-necked flask equipped with a reflux condenser and a thermometer was charged with 210 g (1.02 mol) of POP, 165 g (2.04 mol) of the 37 wt. % formaldehyde aqueous solution, 16.9 g (0.20 mol) of the 48 wt. % sodium hydroxide aqueous solution, and 134 g of xylene. The internal temperature was increased to 90° C., and then the reaction was carried out for 3 hours at the same temperature to obtain a resin liquid. After cooling this resin liquid, water and 50 g of 15 wt. % hydrochloric acid were added thereto for neutralization, the mixture was stirred and allowed to stand, and the aqueous layer was subsequently separated. The xylene layer was then repeatedly washed with water twice to obtain the neutralized resin liquid. The xylene layer containing the neutralized resin liquid was subsequently vacuum concentrated for 4 hours at a reduced pressure of 200 to 30 torr and an internal temperature of 55 to 100° C., and was confirmed to contain 0.98 wt. % of unreacted POP and 0.46 wt. % of xylene. Then, the bath temperature was increased to 120° C., and then the concentrate was stirred for 1.4 hours while maintaining the temperature, thereby obtaining 268 g of resin E-2 having a weight average molecular weight of 2600. The amount of unreacted POP, the residual amount of the solvent, the softening point, and the acid value of the resultant resin E-2 are shown in Table 1.

Example 3

Synthesis of Resin E-3

A four-necked flask equipped with a reflux condenser and a thermometer was charged with 735 g (3.57 mol) of POP, 578 g (7.14 mol) of the 37 wt. % formaldehyde aqueous solution, 59.3 g (0.71 mol) of the 48 wt. % sodium hydroxide aqueous solution, and 468 g of toluene. The internal temperature was increased to 85° C., and then the reaction was carried out for 12 hours at the same temperature to obtain a resin liquid. After cooling this resin liquid, water and 117 g of 30 wt. % sulfuric acid were added thereto for neutralization, the mixture was stirred and allowed to stand, and the aqueous layer was subsequently separated. The toluene layer was then repeatedly washed with water twice to obtain the neutralized resin liquid. The toluene layer containing the neutralized resin liquid was subsequently vacuum concentrated for 3 hours at a reduced pressure of 200 to 30 torr and an internal temperature of 55 to 90° C., and was confirmed to contain 0.75 wt. % of unreacted POP and 0.11 wt. % of toluene. Then, the bath temperature was increased to 100° C., and then the concentrate was stirred for 1 hour while maintaining the temperature, thereby obtaining 940 g of resin E-3 having a weight average molecular weight of 1920. The amount of unreacted POP, the residual amount of the solvent, the softening point, and the acid value of the resultant resin E-3 are shown in Table 1.

Example 4

Synthesis of Resin E-4

A four-necked flask equipped with a reflux condenser and a thermometer was charged with 210 g (1.02 mol) of POP, 165 g (2.04 mol) of the 37 wt. % formaldehyde aqueous solution, 12.9 g (0.15 mol) of the 48 wt. % sodium hydroxide aqueous solution, and 134 g of toluene. The internal temperature was increased to 75° C., and then the reaction was carried out for 7 hours at the same temperature to obtain a resin liquid. After cooling this resin liquid, water and 25 g of 30 wt. % sulfuric acid were added thereto for neutralization, the mixture was stirred and allowed to stand, and the aqueous layer was subsequently separated. The toluene layer was then repeatedly washed with water twice to obtain the neutralized resin liquid. The toluene layer containing the neutralized resin liquid was subsequently vacuum concentrated for 4 hours at a reduced pressure of 200 to 30 torr and an internal temperature of 55 to 80° C., and was confirmed to contain 0.99 wt. % of unreacted POP and 0.60 wt. % of toluene. Then, the bath temperature was increased to 110° C., and then the concentrate was stirred for 2.8 hours while maintaining the temperature, thereby obtaining 255 g of resin E-4 having a weight average molecular weight of 2150. The amount of unreacted POP, the residual amount of the solvent, the softening point, and the acid value of the resultant resin E-4 are shown in Table 1.

Example 5

Synthesis of Resin E-5

A four-necked flask equipped with a reflux condenser and a thermometer was charged with 210 g (1.02 mol) of POP, 165 g (2.04 mol) of the 37 wt. % formaldehyde aqueous solution, 19.0 g (0.23 mol) of the 48 wt. % sodium hydroxide aqueous solution, and 134 g of toluene. The internal temperature was increased to 75° C., and then the reaction was carried out for 3 hours at the same temperature to obtain a resin liquid. After cooling this resin liquid, water and 30 g of 15 wt. % hydrochloric acid were added thereto for neutralization, the mixture was stirred and allowed to stand, and the aqueous layer was subsequently separated. The toluene layer was then repeatedly washed with water twice to obtain the neutralized resin liquid. The toluene layer containing the neutralized resin liquid was subsequently vacuum concentrated for 4 hours at a reduced pressure of 200 to 30 torr and an internal temperature of 55 to 80° C., and was confirmed to contain 0.58 wt. % of unreacted POP and 0.70 wt. % of toluene. Then, the bath temperature was increased to 100° C., and then the concentrate was stirred for 2 hours while maintaining the temperature, thereby obtaining 262 g of resin E-5 having a weight average molecular weight of 1410. The amount of unreacted POP, the residual amount of the solvent, the softening point, and the acid value of the resultant resin E-5 are shown in Table 1.

Comparative Example 1

Synthesis of Resin F-1

A four-necked flask equipped with a reflux condenser and a thermometer was charged with 210 g (1.02 mol) of POP, 165 g (2.04 mol) of the 37 wt. % formaldehyde aqueous solution, 10.6 g (0.13 mol) of the 48 wt. % sodium hydroxide aqueous solution, and 134 g of toluene. The internal temperature was increased to 80° C., and then the reaction was carried out for 6 hours at the same temperature to obtain a resin liquid. After cooling this resin liquid, water and 32 g of 30 wt. % sulfuric acid were added thereto for neutralization, the mixture was stirred and allowed to stand, and the aqueous layer was subsequently separated. The toluene layer was then repeatedly washed with water twice to obtain the neutralized resin liquid. The toluene layer containing the neutralized resin liquid was subsequently vacuum concentrated for 4 hours at a reduced pressure of 200 to 30 torr and an internal temperature of 55 to 80° C., and was confirmed to contain 1.6 wt. % of unreacted POP and 0.80 wt. % of toluene. Then, the bath temperature was increased to 120° C., and then the concentrate was stirred for 2.3 hours while maintaining the temperature, thereby obtaining 265 g of resin F-1 having a weight average molecular weight of 2100. The amount of unreacted POP, the residual amount of the solvent, the softening point, and the acid value of the resultant resin F-1 are shown in Table 2.

Comparative Example 2

Synthesis of Resin F-2

A four-necked flask equipped with a reflux condenser and a thermometer was charged with 210 g (1.02 mol) of POP, 165 g (2.04 mol) of the 37 wt. % formaldehyde aqueous solution, 21.5 g (0.26 mol) of the 48 wt. % sodium hydroxide aqueous solution, and 21 g of toluene. The internal temperature was increased to 75° C., and then the reaction was carried out for 3 hours at the same temperature to obtain a resin liquid. After cooling this resin liquid, water, 113 g of toluene, and 43 g of 30 wt. % sulfuric acid were added thereto for neutralization, the mixture was stirred and allowed to stand, and the aqueous layer was subsequently separated. The toluene layer was then repeatedly washed with water twice to obtain the neutralized resin liquid. The toluene layer containing the neutralized resin liquid was subsequently vacuum concentrated for 4 hours at a reduced pressure of 200 to 30 torr and an internal temperature of 55 to 80° C., and was confirmed to contain 1.0 wt. % of unreacted POP and 0.50 wt. % of toluene. Then, the bath temperature was increased to 120° C., and then the concentrate was stirred for 1.5 hours while maintaining the temperature, thereby obtaining 242 g of resin F-2 having a weight average molecular weight of 1990. The amount of unreacted POP, the residual amount of the solvent, the softening point, and the acid value of the resultant resin F-2 are shown in Table 2.

Comparative Example 3

Synthesis of Resin F-3

A four-necked flask equipped with a reflux condenser and a thermometer was charged with 210 g (1.02 mol) of POP, 165 g (2.04 mol) of the 37 wt. % formaldehyde aqueous solution, 16.9 g (0.20 mol) of the 48 wt. % sodium hydroxide aqueous solution, and 134 g of toluene. The internal temperature was increased to 85° C., and then the reaction was carried out for 3 hours at the same temperature to obtain a resin liquid. After cooling this resin liquid, 123 g of 15 wt. % hydrochloric acid was added thereto for neutralization, the mixture was stirred and allowed to stand, and the aqueous layer was subsequently separated. The toluene layer was then repeatedly washed with water twice to obtain the neutralized resin liquid. This toluene layer containing the neutralized resin liquid was subsequently vacuum concentrated for 4 hours at a reduced pressure of 200 to 30 torr and an internal temperature of 55 to 80° C., and was confirmed to contain 1.8 wt. % of unreacted POP and 0.11 wt. % of toluene. Then, the bath temperature was increased to 110° C., and then the concentrate was stirred for 2.0 hours while maintaining the temperature, thereby obtaining 247 g of resin F-3 having a weight average molecular weight of 2600. The amount of unreacted POP, the softening point, and the acid value of the resultant resin F-3 are shown in Table 2.

Comparative Example 4

Synthesis of Resin F-4

A four-necked flask equipped with a reflux condenser and a thermometer was charged with 210 g (1.02 mol) of POP, 165 g (2.04 mol) of the 37 wt. % formaldehyde aqueous solution, 21.5 g (0.26 mol) of the 48 wt. % sodium hydroxide aqueous solution, and 134 g of toluene. The internal temperature was increased to 85° C., and then the reaction was carried out for 14 hours at the same temperature to obtain a resin liquid. After cooling this resin liquid, water and 43 g of 30 wt. % sulfuric acid were added thereto for neutralization, the mixture was stirred and allowed to stand, and the aqueous layer was subsequently separated. The toluene layer was then repeatedly washed with water twice to obtain the neutralized resin liquid. This toluene layer containing the neutralized resin liquid was vacuum concentrated for 3 hours at a reduced pressure of 200 to 30 torr and an internal temperature of 55 to 100° C., thereby obtaining 268 g of resin F-4. The resultant resin F-4 contained 0.58 wt. % of unreacted POP and 0.22 wt. % of toluene, and had a weight average molecular weight of 2450. The amount of unreacted POP, the residual amount of the solvent, the softening point, and the acid value of the resultant resin F-4 are shown in Table 2.

Comparative Example 5

Synthesis of Resin F-5

A four-necked flask equipped with a reflux condenser and a thermometer was charged with 210 g (1.02 mol) of POP, 165 g (2.04 mol) of the 37 wt. % formaldehyde aqueous solution, and 10.6 g (0.13 mol) of the 48 wt. % sodium hydroxide aqueous solution. After increasing the internal temperature to 85° C., the reaction was carried out for 6 hours at the same temperature, and then cooled to obtain a resin liquid. Then, 134 g of toluene, water, and 21 g of 30 wt. % sulfuric acid were added thereto for neutralization, the mixture was stirred and allowed to stand, and the aqueous layer was subsequently separated. The toluene layer was then repeatedly washed with water twice to obtain the neutralized resin liquid. This toluene layer containing the neutralized resin liquid was vacuum concentrated for 3.3 hours at a reduced pressure of 760 to 90 torr and an internal temperature of 55 to 110° C., thereby obtaining 265 g of resin F-5. The resultant resin F-5 contained 0.70 wt. % of unreacted POP and 2.9 wt. % of toluene, and had a weight average molecular weight of 5150. The amount of unreacted POP, the residual amount of the solvent, the softening point, and the acid value of the resultant resin F-5 are shown in Table 2.

Reference Example 1

Analysis of Commercial Product Tackirol 201 (TAL 201)

Tackirol 201 (hereinafter referred to as TAL 201), the p-t-alkylphenol-formaldehyde co-condensation resin manufactured by Taoka Chemical Co., Ltd., was analyzed under the analytical conditions described above, and the results are shown in Table 1 as Reference Example 1.

TABLE 1

|  | Ref. Ex. 1 | Ex. 1 | Ex. 2 | Ex. 3 | Ex. 4 | Ex. 5 |
|---|---|---|---|---|---|---|
| Resin No. | TAL201 | E-1 | E-2 | E-3 | E-4 | E-5 |
| Resin Mw | — | 2,100 | 2,600 | 1,920 | 2,150 | 1,410 |
| Amount of Residual Solvent (wt. %) | 3.9 | 0.67 | 0.46 | 0.11 | 0.60 | 0.70 |
| Amount of Unreacted POP (wt. %) | 1.1 | 0.69 | 0.98 | 0.75 | 0.99 | 0.58 |
| Softening Point (° C.) | 86 | 79 | 91 | 92 | 76 | 71 |
| Acid Value (KOHmg/g) | 21.0 | 21.8 | 23.3 | 27.8 | 20.3 | 22.6 |

TABLE 2

|  | Comp. Ex. 1 | Comp. Ex. 2 | Comp. Ex. 3 | Comp. Ex. 4 | Comp. Ex. 5 |
|---|---|---|---|---|---|
| Resin No. | F-1 | F-2 | F-3 | F-4 | F-5 |
| Resin Mw | 2,100 | 1,990 | 2,600 | 2,450 | 5,150 |
| Amount of Residual Solvent (wt. %) | 0.80 | 0.50 | 0.11 | 0.22 | 2.9 |
| Amount of Unreacted POP (wt. %) | 1.6 | 1.0 | 1.8 | 0.58 | 0.70 |
| Softening Point (° C.) | 74 | 110 | 89 | 104 | 106 |
| Acid Value (KOHmg/g) | 16.1 | 19.3 | 34.5 | 29.1 | 26.1 |

(2) Preparation of Uncross-Linked Rubber Compositions and Cross-Linked Rubbers, and Implementation of Property Tests The following property tests were implemented on uncross-linked rubber compositions and cross-linked rubbers prepared below.

<Cross-Linking Properties of Uncross-Linked Rubber Compositions>

The maximum torque (MH, unit: dN/m) and the cross-linking curve of each uncross-linked rubber composition were found by measurement using a rotorless rheometer (190° C., 60 minutes). The MH values shown in Tables 3 and 4 represent relative values (%) when the value of the uncross-linked rubber composition in Reference Example 2 is taken as 100%. MH found under the conditions used herein is associated with a cross-linking density at a certain point of time in the course of cross-linking. The greater the MH value is, the better it is.

<Hardnesses of Cross-Linked Rubbers>

In accordance with JIS K6253, a hardness Hs of each cross-linked rubber was measured using a type A durometer. The Hs values shown in Tables 3 and 4 represent relative values (%) when the value of the cross-linked rubber in Reference Example 2 is taken as 100%. The hardness Hs is associated with a cross-linking density of the cross-linked rubber. The greater the Hs value is, the better it is.

<Tensile Properties of Cross-Linked Rubbers>

In accordance with JIS K6251, dumbbell-shaped specimens were prepared from each cross-linked rubber to measure a modulus M200 (MPa), a breaking strength Tb (MPa), and a breaking elongation Eb (%). The M200, Tb, and Eb values shown in Tables 3 and 4 are relative values (%) when the values of the cross-linked rubber in Reference Example 2 are taken as 100%. M200 represents a tensile stress of a specimen at the time of an elongation percentage of 200%, and is associated with a cross-linking density of the cross-linked rubber. The greater the M200 value is, the better it is. Tb represents a tensile stress at break of a specimen, and is a value associated with the strength (cross-linking density) of the rubber. The value of Tb tends to become smaller as the dispersibility of the co-condensation resin or the molding of the rubber sheet deteriorates. The greater the Tb value is, the better it is. Eb represents an elongation percentage at break of a specimen, and is a value associated with the strength (cross-linking density) of the rubber. The value of Eb tends to become smaller as the dispersibility of the co-condensation resin or the molding of the rubber sheet deteriorates. The greater the Eb value is, the better it is.

<Heat Aging Resistance of Cross-Linked Rubbers>

With reference to the accelerated aging testing method defined in JIS K6257, a specimen prepared from each cross-linked rubber was maintained for 200 hr in a gear oven at 150° C., and then a Tb value of the specimen (after the heat aging test) and a retention ratio of the Tb value before and after the heat aging test (Tb after heat aging/initial Tb) were measured. The Tb values after the heat aging test shown in Tables 3 and 4 are relative values (%) when the value of the cross-linked rubber in Reference Example 2 is taken as 100%. The greater the Tb value after the heat aging test is, the better it is, and the greater the retention ratio of the Tb value (Tb after heat aging/initial Tb) is, the better it is, because of a less reduction due to heat aging.

Example 6

A masterbatch rubber containing polysar butyl 402 (butyl rubber manufactured by Polysar Corporation), HAF carbon (carbon black manufactured by Tokai Carbon Co., Ltd.), zinc white, and stearic acid according to the compounding formulation shown in Table 3 was placed in a roll, resol-type para-octylphenol-formaldehyde co-condensation resin E-1 was added thereto, and the mixture was kneaded to prepare 200 g of an uncross-linked rubber composition. The uncross-linked rubber composition was subsequently press-molded at 190° C. and heated to prepare a cross-linked rubber sheet. Table 3 shows the measurement results of the cross-linking property test, hardness, tensile test, and heat aging resistance test in accordance with the above-described methods, performed on the uncross-linked rubber composition and the cross-linked rubber compounded with resin E-1, together with the measurement results for the uncross-linked rubber composition and the cross-linked rubber in Reference Example 2 obtained using TAL201 instead of resin E-1.

Examples 7 to 10 and Comparative Examples 6 to 10

Uncross-linked rubber compositions and cross-linked rubbers were prepared as in Example 1 except that the resins shown in Tables 3 and 4 were used instead of the resol-type para-octylphenol-formaldehyde co-condensation resin E-1, and the tests were performed. The test results are shown in Tables 3 and 4.

TABLE 3

| Compounding | | Ref. Ex. 2 | Ex. 6 | Ex. 7 | Ex. 8 | Ex. 9 | Ex. 10 |
|---|---|---|---|---|---|---|---|
| Polysar Butyl 402 | Part(s) by Weight | 100 | 100 | 100 | 100 | 100 | 100 |
| HAF Carbon | | 50 | 50 | 50 | 50 | 50 | 50 |
| Zinc White | | 5 | 5 | 5 | 5 | 5 | 5 |
| Stearic Acid | | 1 | 1 | 1 | 1 | 1 | 1 |
| Resin TAL201 | | 15 | — | — | — | — | — |
| Resin E-1 | | — | 15 | — | — | — | — |
| Resin E-2 | | — | — | 15 | — | — | — |
| Resin E-3 | | — | — | — | 15 | — | — |
| Resin E-4 | | — | — | — | — | 15 | — |
| Resin E-5 | | — | — | — | — | — | 15 |
| MH | | 100% | 98% | 100% | 103% | 98% | 98% |
| M200 | | 100% | 122% | 107% | 101% | 112% | 98% |
| Hs | | 100% | 102% | 102% | 100% | 101% | 107% |
| Tb | | 100% | 99% | 99% | 106% | 96% | 97% |
| Eb | | 100% | 94% | 93% | 94% | 92% | 92% |
| Tb after Heat Aging Test | | 100% | 106% | 111% | 135% | 100% | 104% |
| Retention Ratio of Tb | | 38% | 41% | 43% | 49% | 40% | 44% |

TABLE 4

| | | Comp. Ex. 6 | Comp. Ex. 7 | Comp. Ex. 8 | Comp. Ex. 9 | Comp. Ex. 10 |
|---|---|---|---|---|---|---|
| Polysar Butyl 402 | Part(s) by Weight | 100 | 100 | 100 | 100 | 100 |
| HAF Carbon | | 50 | 50 | 50 | 50 | 50 |
| Zinc White | | 5 | 5 | 5 | 5 | 5 |
| Stearic Acid | | 1 | 1 | 1 | 1 | 1 |
| Resin F-1 | | 15 | — | — | — | — |
| Resin F-2 | | — | 15 | — | — | — |
| Resin F-3 | | — | — | 15 | — | — |
| Resin F-4 | | — | — | — | 15 | — |
| Resin F-5 | | — | — | — | — | 15 |
| MH | | 86% | 74% | 104% | 107% | 103% |
| M200 | | 98% | 77% | 114% | 105% | 105% |
| Hs | | 95% | 87% | 102% | 102% | 100% |
| Tb | | 100% | 107% | 72% | 85% | 88% |
| Eb | | 104% | 140% | 69% | 78% | 87% |
| Tb after Heat Aging Test | | 104% | 76% | 107% | 98% | — |
| Retention Ratio of Tb | | 41% | 27% | 60% | 44% | — |

(3) Performance Evaluation of Resin Cross-Linking Agents, Uncross-Linked Rubber Compositions, and Cross-Linked Rubbers From the results of the various property tests described above, performance evaluation was conducted for the cross-linking densities of the uncross-linked rubber compositions and the cross-linked rubbers, the dispersibility of the resin cross-linking agents (co-condensation resins)/the moldability of the uncross-linked rubber compositions, the heat aging resistance of the cross-linked rubbers, and bad odors of the resin cross-linking agents (co-condensation resins). The results are shown in Tables 5 and 6.

<Cross-Linking Density>

Effects on the cross-linking densities of the resin cross-linking agents were evaluated by comparison with Reference Example 2, with an emphasis on M200 and Hs, which are properties of the cross-linked rubbers, together with MH measured by the rheometer test. A difference of 3 pt or more was set as a significant difference for MH and M200, and a difference of 2 pt or more was set as a significant difference for Hs. As compared to Reference Example 2, cases where all the three parameters, i.e., MH, M200, and Hs, were equal were evaluated as B, cases where a parameter more than equal was included were evaluated as A, and cases where a parameter less than equal was included were evaluated as C.

<Dispersibility and Moldability (Evaluation in Terms of Tb and Eb)>

Effects on the dispersibility of the resin cross-linking agents and the moldability of the uncross-linked rubber compositions were evaluated by visually observing the cross-linked rubber sheets, and by comparing Tb and Eb values with those of Reference Example 2. The use of a resin cross-linking agent with poor dispersibility tends to cause variations in cross-linked rubbers, and tends to result in small Tb and Eb values. The Tb and Eb values also tend to be small if there are problems with the moldability of an uncross-linked rubber composition, such as foaming, thinning, and the like of the cross-linked rubber. Thus, a difference of 5 pt or more was set as a significant difference for Tb, and a difference of 10 pt or more was set as a significant difference for Eb, and as compared to Reference Example 2, cases where Tb and Eb were both equal were evaluated as A, and cases where Tb and/or Eb were/was less then equal were evaluated as C.

<Dispersibility and Moldability (Evaluation by Visual Observation)>

The uncross-linked rubber compositions after kneading in a roll and the cross-linked rubber sheets after press-molding were visually observed, and evaluated for the presence or absence of an agglomerate and foaming. Cases where an agglomerate, foaming, or a deformation (thinning of the cross-linked rubber sheet, for example) was found were evaluated as C, and cases where they were not found were evaluated as A.

<Heat Aging Resistance>

Effects on the heat aging resistance of the cross-linked rubbers were evaluated in terms of the Tb values of the cross-linked rubbers after the heat aging test and the retention ratios of the Tb values before and after the heat aging test (Tb after heat aging/initial Tb). A difference of 5 pt or more was set as a significant difference for Tb, and as compared to Reference Example 2, cases where Tb after the test and the retention ratio of the Tb value were both equal were evaluated as B, cases where Tb after the test and/or the retention ratio of Tb were/was more than equal were evaluated as A, and cases where Tb after the test and/or the retention ratio of Tb were/was less than equal were evaluated as C.

<Bad Odors>

Odors of the resin cross-linking agents (co-condensation resins) were smelt by five persons, and determinations were made based on the number of persons who felt the smell unpleasant. Cases where the number of persons who felt the smell unpleasant was 1 or less were evaluated as A, and cases where the number was two or more were evaluated as C.

TABLE 5

|  | Ref. Ex. 2 | Ex. 6 | Ex. 7 | Ex. 8 | Ex. 9 | Ex. 10 |
|---|---|---|---|---|---|---|
| Compounding Resin | TAL 201 | E-1 | E-2 | E-3 | E-4 | E-5 |
| Cross-linking Density | — | A | A | A | A | A |
| Dispersibility/Moldability (Tb/Eb) | — | A | A | A | A | A |
| Dispersibility/Moldability (External Appearance) | A | A | A | A | A | A |
| Heat Aging Resistance | — | A | A | A | B | B |
| Bad Odor | C | A | A | A | A | A |

TABLE 6

|  | Comp. Ex. 6 | Comp. Ex. 7 | Comp. Ex. 8 | Comp. Ex. 9 | Comp. Ex. 10 |
|---|---|---|---|---|---|
| Compounding Resin | F-1 | F-2 | F-3 | F-4 | F-5 |
| Cross-linking Density | C | C | A | A | A |
| Dispersibility/Moldability (Tb/Eb) | A | A | C | C | C |
| Dispersibility/Moldability (External Appearance) | A | C | C | C | C |
| Heat Aging Resistance | B | C | A | B | — |
| Bad Odor | C | A | C | A | C |

The invention claimed is:

1. A resol-type para-octylphenol-formaldehyde co-condensation resin,
   having a content of a para-octylphenol monomer of 1 wt. % or less,
   having a total content of an aliphatic hydrocarbon, a halogenated aliphatic hydrocarbon, an aromatic hydrocarbon, a halogenated aromatic hydrocarbon, and an alcohol having 1 to 8 carbon atoms of 1 wt. % or less, the aliphatic hydrocarbon, the halogenated aliphatic hydrocarbon, the aromatic hydrocarbon, the halogenated aromatic hydrocarbon, and the alcohol having a boiling point of 60° C. or more,
   having a softening point of 70 to 105° C., and
   having an acid value of 20 to 28 KOHmg/g.

2. A rubber composition, comprising:
   100 parts by weight of a rubber; and
   1 to 20 parts by weight of the resol-type para-octylphenol-formaldehyde co-condensation resin according to claim 1.

3. A method for producing the resol-type para-octylphenol-formaldehyde co-condensation resin according to claim 1, the method comprising the steps of:
   (1) reacting para-octylphenol with formaldehyde at 40 to 100° C. using a hydroxide of an alkali metal as a catalyst in an amount of 0.15 to 0.24 equivalent per equivalent of the para-octylphenol, and in the presence of at least one of organic solvents selected from the group consisting of an aliphatic hydrocarbon, a halogenated aliphatic hydrocarbon, an aromatic hydrocarbon, a halogenated aromatic hydrocarbon, and an alcohol having 1 to 8 carbon atoms, the aliphatic hydrocarbon, the halogenated aliphatic hydrocarbon, the aromatic hydrocarbon, the halogenated aromatic hydrocarbon, and the alcohol having a boiling point of 60° C. or more, to obtain a resin liquid containing a resol-type para-octylphenol-formaldehyde co-condensation resin;
   (2) neutralizing the resin liquid with 0.3 to 2 equivalents of an acid component per equivalent of a base content of the hydroxide; and
   (3) concentrating and thereafter heating at 100 to 140° C. the neutralized resin liquid to provide the resol-type para-octylphenol-formaldehyde co-condensation resin with a weight-average molecular weight of 1400 to 2600.

* * * * *